United States Patent [19]

Miyahara et al.

[11] Patent Number: 4,764,981

[45] Date of Patent: Aug. 16, 1988

[54] REMOTE CONTROL CIRCUIT

[75] Inventors: Yoshinori Miyahara; Kazuo Hasegawa, both of Furukawa, Japan

[73] Assignee: Alps Electric Co., Ltd., Japan

[21] Appl. No.: 868,792

[22] Filed: May 29, 1986

[30] Foreign Application Priority Data

May 29, 1985 [JP] Japan ............................ 60-116288
Jun. 20, 1985 [JP] Japan ............................ 60-132979

[51] Int. Cl.⁴ ............................................ H04B 9/00
[52] U.S. Cl. .................................... 455/603; 455/607
[58] Field of Search ...................... 455/603, 607, 151; 371/34

[56] References Cited

U.S. PATENT DOCUMENTS

| | | | |
|---|---|---|---|
| 3,453,592 | 7/1969 | Ishii et al. | 371/34 |
| 4,322,855 | 3/1982 | Mogi et al. | 455/151 |
| 4,395,780 | 7/1983 | Gohm et al. | 370/1 |
| 4,526,010 | 7/1985 | Sato et al. | 371/34 |

OTHER PUBLICATIONS

Miyamoto et al—Radio Terminal Device—NEC Res. & Develop. (Japan), No. 50, Jul. 1978, pp. 62–78.

*Primary Examiner*—Michael A. Masinick
*Assistant Examiner*—L. Van Beek
*Attorney, Agent, or Firm*—Guy W. Shoup; Glenn Ostrager; Leighton K. Chong

[57] ABSTRACT

A remote control device comprises a control input unit, a transmission unit, a receiving unit, a reply unit and a command control circuit. The control input unit outputs a control signal. The transmission unit stores the control signal in a first memory circuit and transmits a light signal based on the control signal. A main device controlled by the remote control unit receives in a first receiver circuit and stores in a second memory circuit the signal from the transmission unit. The main device has a reply signal unit for transmitting a return signal based on the signal from the receiving unit to a second receiver circuit of the remote control device. The command control circuit compares the signal received by the second receiver circuit and the signal stored in the first memory circuit. When these compared signals are in agreement, the command control circuit outputs to the transmission unit a signal based on the signal stored in the second memory circuit thereby to cause the operating device to operate. When they are not in agreement, then the circuit outputs a signal to a display unit for an error display.

6 Claims, 5 Drawing Sheets

FIG. 2

| | CUSTOM CODE | DATA CODE |
|---|---|---|
| a1 | | 1 0 1 0 1 0 1 0 |
| b1 | 1 1 1 1 0 0 0 0 | 1 0 1 0 1 0 1 0 |
| c1 | | 1 1 0 0 1 1 0 0 |
| b2 | 1 1 1 1 0 0 0 0 | 1 1 0 0 1 1 0 0 |
| c2 | | 1 1 1 1 0 0 0 0 |
| b3 | 1 1 1 1 0 0 0 0 | 1 1 1 1 0 0 0 0 |
| e1 | | 0 0 0 1 1 1 0 0 |
| b11 | 0 0 0 0 1 1 1 1 | 1 0 1 0 1 0 1 0 |
| e2 | 0 0 0 0 1 1 1 0 | 0 0 0 1 1 1 0 0 |

FIG. 4

| | CUSTOM CODE | DATA CODE |
|---|---|---|
| 4a1 | | 1 0 1 0 1 0 1 0 |
| 4b1 | 1 1 1 1 0 0 0 0 | 1 0 1 0 1 0 1 0 |
| 4c1 | | 1 1 0 0 1 1 0 0 |
| 4b2 | 1 1 1 1 0 0 0 0 | 1 1 0 0 1 1 0 0 |
| 4c2 | | 1 1 1 1 0 0 0 0 |
| 4b3 | 1 1 1 1 0 0 0 0 | 1 1 1 1 0 0 0 0 |
| 4e1 | | 0 0 0 1 1 1 0 0 |
| 4b11 | 0 0 0 0 1 1 1 1 | 1 0 1 0 1 0 1 0 |
| 4f1 | 0 0 0 0 1 1 1 0 | 0 0 0 1 1 1 0 0 |

| | CUSTOM CODE | | DATA CODE | |
|---|---|---|---|---|
| | LIMITED CODE | INVERTED LIMITED CODE | CONTROL SIGNAL | INVERTED CONTROL SIGNAL |
| (a) | | | 00000001 | |
| (b) | 00000111 | 11111000 | 00000001 | 11111110 |

REMOTE CONTROL CIRCUIT

FIELD OF INDUSTRIAL APPLICATION

The present invention relates to a remote control circuit such as for a "handy type" cordless keyboard or a remote control for an audiovisual system, which is used for a complicated operation, and particularly where the decision time for the user to realize a wrong operation and make a corrective action is reduced, and the reliability of the operating state of the main device corresponding to the operation is improved, and further relates to a remote control circuit in which if the command operation is not carried out by the main device because of noise or the transmitting distance, the operability of resending the command is improved.

BACKGROUND ART

The use of a cordless remote control device for operating domestic electronic devices such as personal computers is increasing. Furthermore the personal computer is expected to be very common as a general domestic information terminal in future.

However, there is a need for an easy to use input device for a general domestic personal computer for which the input operation is easy for the operator and which can be operated at any point in the room.

The conventional use of a remote control unit with a personal computer will now be described with reference to FIG. 6 and FIG. 7. FIG. 6 is a structural diagram of a remote control circuit of a conventional personal computer, and FIG. 7 illustrates the various signal codes thereof.

In the drawings, 30 is a remote control unit, 31 is a control input unit, 32 is a transmitter controller circuit, 33 is a transmitter circuit, 34 is a main device, 35 is a receiver circuit, 36 is a receiver controller circuit, 37 is an operation unit, 38 is an operation detecting circuit, 39 and 41 are display circuits, and 40 is a control detection circuit.

The control input unit 31 is operated selectively corresponding to the various operating functions of the main device 34 such as for example a personal computer, and outputs a control signal in some digital code. FIG. 7 shows an example of an 8 bit control signal output. This control signal is next input to the transmitter controller circuit 32. In the transmitter control circuit 32, the transmitter circuit 33 and control detection circuit are connected. In the transmitter controller circuit 32, based on the control signal input, as shown in FIG. 7, a 16 bit data code is generated from the control signal and an inverted control signal which has every bit of the control signal inverted, and in order to prevent interference with the signals of other devices, a 16 bit custom code is produced from a limited code and the inverted limited code. The non-inverted codes and the inverted codes are discriminated in the main device 34 and when they are the corresponding codes, a provision is made that the following operation can be made, in order to prevent erroneous operation. The 16 bit custom code and data code are combined to form a 32 bit control data signal which is sent to the transmitter circuit 33. Also at this point, from the transmission controller circuit 32 the input control signal is passed through the control detection circuit 40 and the command given is displayed by the display circuit 41. Then an infra-red command signal is emitted by the transmitter circuit 33 based on the control data signal input, and is transmitted to the main device 34. The receiver circuit 35 of the main device 34 detects with an optical detector element the infra-red ray control command signal transmitted by the remote control unit 30. The control command signal detected by the optical detector element is output from the receiver circuit 35 as a code with the same contents as the control data signal, and is input to the receiver controller circuit 36, and is then subject to erroneous operation prevention processing as follows.

The limited code and the inverted limited code of the custom code are added, and a test is made as to whether all 8 bits are 1. If it is detected that at least one bit of the sum is 0, the following operation is not carried out. When, however, all the bits are 1, the limited code is compared with a limited code stored previously in the main device 34, and if they are in agreement next the data code is subject to erroneous operation prevention processing in the same way as the custom code. In the normal case then the control signal is decoded. If an abnormality is detected, and the processing in progress is abandoned, then with the command signal to be reinput a reset is done and the same processing is carried out. The decoded control signal is output from the receiver controller circuit 36 to the operation unit 37 based on the contents of the control signal, and the operation selected on the remote control unit 30 is carried out by the operation unit 37. Additionally the operating state of the operation unit 37 is converted by the operation detecting circuit 38 to a display signal, and displayed by the display circuit 39.

PROBLEM TO BE SOLVED BY THE INVENTION

There are, however, the following problems with the above described type of remote control circuit.

Specifically, conventionally if there is an erroneous operation, and the command is carried out by the main device, and the operation done, if the display of the result is not seen it will not be realized, and if the user realizes once the operation has started, then even if a correction command is given, depending on the nature of the command there may be a delay until the processing is completed. Furthermore, even if the command given is correct, when the receiving state is unstable because of for example noise or the transmission distance, then there will be a delay until the user has confirmed whether or not the desired command has been executed, and changed the position of the remote control unit, so that when the operation results were not desired, it is not possible to determine whether there was an erroneous operator control or an erroneous operation by the machine. Therefore control was carried out while monitoring the operation results of the main device 24 before and after the control operation.

As above, the operation of the conventional remote control circuit is of poor efficiency, and the reliability is low as an input device for a terminal, so it is problematical for application to a device requiring many commands.

Moreover, when the receiving conditions are unstable because of the transmission distance determined by the operating position or because of infra-red noise, there are cases where the signal does not correctly reach the main device and error processing is carried out. In cases such as this, it is necessary to make the control operation again, but when commands require a large number of operations, in order to determine which of the operations caused the error the user will be required to compare visually the display of the main device and the display of the remote control unit, and when making a correction the operability will be worsened, so it is problematical for application to a device requiring many commands.

Therefore the present invention has as its technical objective the provision of a remote control circuit for a number of complicated operating commands and such that the user can rapidly determine the reception conditions of the command, and improved reliability of operation with respect to the content of the commands, and moreover, the provision of a remote control circuit for a number of complicated operating commands and such that the user can rapidly confirm the reception conditions of the command, and with improved correction operation when a reception error has occurred.

MEANS OF SOLVING THE PROBLEM

In order to solve the technical objective above, the present invention is characterised by comprising a control input unit 2 outputting a control signal a, a transmission unit storing the control signal a in a first memory circuit 6 and transmitting a light signal based on the control signal a, a receiving unit receiving in a first receiver circuit 8 and storing in a second memory circuit the signal from the transmission unit, a reply signal unit transmitting a light signal based on the signal from the receiving unit to a second receiver circuit 16, and a command control circuit 4 which compares the signal received by said second receiver circuit 16 and the signal stored in said first memory circuit 6 and when they are in agreement outputs to said transmission unit a signal based on the signal stored in said second memory circuit in order to cause the operating device 12 to operate and when they are not in agreement outputs a signal to a display unit 18 for an error display.

It is further characterised by comprising a control input unit 402 outputting a control signal *4a*, a transmission unit 418 storing the control signal *4a* in a first memory circuit 406 and transmitting a light signal based on the control signal *4a*, a receiving unit 419 receiving in a first receiver circuit 408 and storing in a second memory circuit the signal from the transmission unit 418, a reply signal unit 20 transmitting a light signal based on the signal from the receiving unit 419 to a second receiver circuit 415, and a command control circuit 404 which compares the signal received by said second receiver circuit 415 and the signal stored in said first memory circuit 406 and when they are in agreement outputs to said transmission unit 418 a signal based on the signal stored in said second memory circuit in order to cause the operating device 411 to operate and when they are not in agreement outputs a signal to a display unit 417 so that the contents stored in said first memory circuit 406 are displayed as an error.

EFFECT

The above technical means have the following effect.

The signal received by the second receiver circuit 16 is compared in the command control circuit 4 with the control signal a stored in the first memory circuit 6 and if the contents are the same a signal is output to the transmission unit in order to cause the signal stored in the second memory circuit to be output in order to cause the operating device 12 to operate, whereas if they are not the same a signal is output to the display unit 18 to cause an error display. Thus the user proceeds to the next operation while watching the display unit 18 of the remote control unit 1.

Alternatively, the signal received by the main device 407 is compared with the control signal *4a* stored by the transmission unit 418 in the command control circuit 404 of the remote control unit 401 and if the contents are in agreement a signal is output to the transmission unit 418 to cause the operating device 411 of the main device 407 to operate, whereas if they are not in agreement a signal is output to cause the contents to be displayed on the display unit 417 as an error. Also, when the user confirms an individual error displayed on the display unit 417 of the remote control unit 401, the control operation can be resent immediately.

BRIEF DESCRIPTION OF THE DRAWINGS

FIG. 2 illustrates various signal codes according to the present invention;

FIG. 4 illustrates various signal codes according to the present invention;

FIG. 6 is a structural diagram; and

FIG. 7 illustrates various signal codes.

Figure 1:
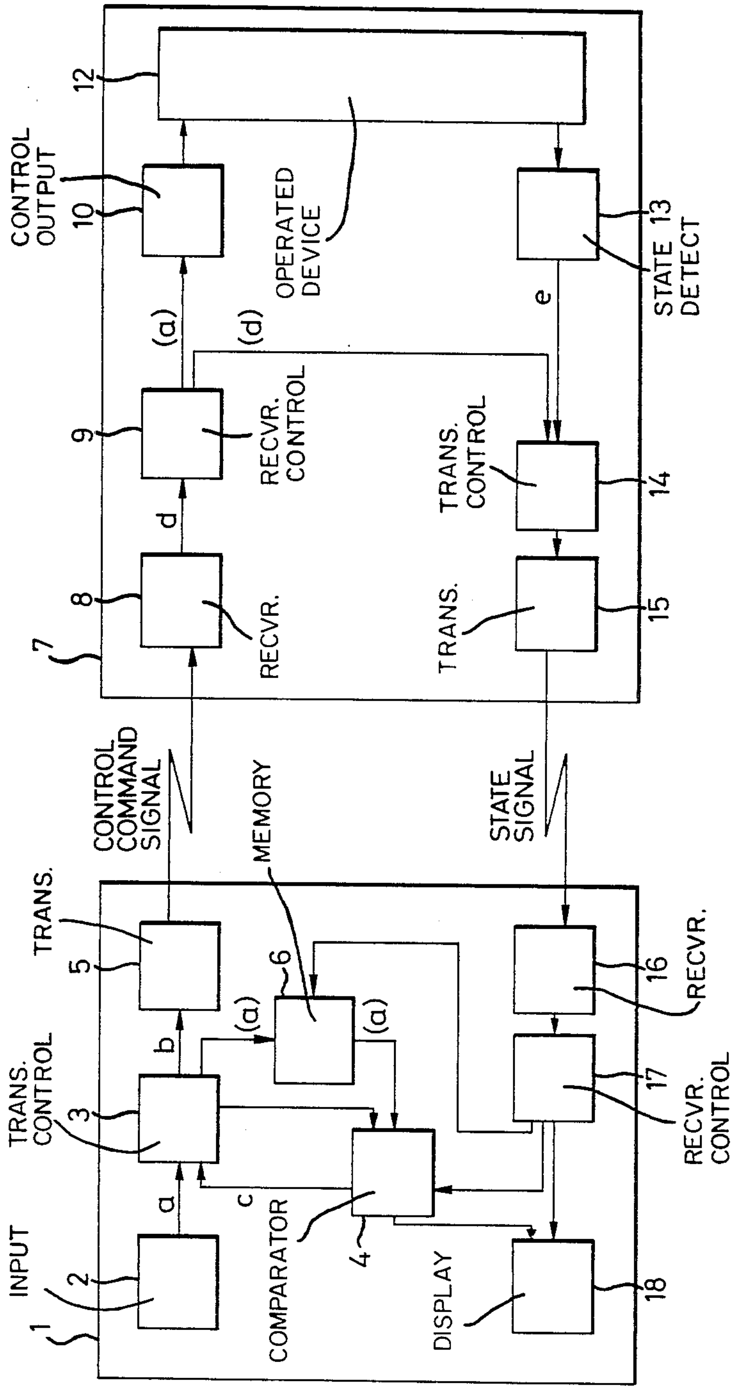
FIG. 1 is a block diagram showing a first embodiment of the present invention.

In the drawings, 1 and 401 are remote control units, 2 and 402 are control input units, 3, 14, 403 and 413 are transmitter controller circuits, 4 and 404 are command control circuits, 5, 15, 405 and 415 are transmitter circuits, 6 and 406 are memory circuits, 7 and 407 are main devices, 8, 16, 408 and 415 are receiver circuits, 9, 17, 409 and 416 are receiver controller circuits, 10 and 410 are control output circuits, 12 and 411 are operating devices, 13 and 412 are operation detecting circuits, 18 is a display unit, 417, *417a* and *417aa* are error display positions, 418 is a transmission unit, 419 is a receiving unit, 420 is a reply transmission unit, and 421 is a monitor, respectively.

DESCRIPTION OF THE PREFERRED EMBODIMENTS

The present invention is now described in detail in terms of FIG. 1 to FIG. 5.

Firstly, FIG. 1 and FIG. 2 are a first embodiment of the present invention. FIG. 1 is a block diagram of an embodiment of the present invention, and FIG. 2 illustrates the various custom codes and data codes thereof.

In the drawings, 1 is a remote control unit, 2 is a control input unit, 3 and 4 are transmitter controller circuits, 4 is a command control circuit, 5 and 15 are transmitter circuits, 6 is a memory circuit such as for example a latch circuit or RAM, 7 is a main device such as for example a personal computer, 8 and 16 are receiver circuits, 9 and 17 are receiver controller circuits, 10 is a control output circuit, 12 is an operating device, 13 is an operation detecting circuit, and 18 is a display unit.

Next, to explain the operation, the control input unit 2 is of the construction of for example, a touch panel, and depending on the control operation an 8 bit control signal a as shown in FIG. *2a* is output to the transmitter control circuit 3. In the transmitter control circuit 3, as the control signal a is input, first, in order to prevent interference with the signals of other devices, an 8 bit custom code and the control code a as a data code are combined.

The 16 bit control data signal b as shown in FIG. 2 b1 formed from the custom code and data code is transmitted through the transmitter circuit 5 to the main device 17 as an infra-red light operating command signal. Also at this time, a synchronizing pulse for the command control circuit 4 and a control signal a for the memory circuit 6 are output respectively from the transmitter controller circuit 3. The synchronizing pulse is output in synchronization with the control signal a being input to the transmitter controller circuit 3, causes a particular operation in the command control circuit, and until the transmitter controller circuit 3 is reset the next synchronizing pulse is not output.

The control signal a is temporarily stored in the memory circuit 6, and until the transmitter controller circuit 3 is reset is not output from the transmitter controller circuit 3 to the memory circuit 6.

When the feedback signal c from the command control circuit 4 is input, the transmitter controller circuit 3 carries out the following operation regardless of the control signal a input. First, when the feedback signal c is as shown in FIG. 2 c1 an 8 bit data code for causing the main device 7 to carry out an operation, the 16 bit control data signal b shown in FIG. 2 b2 is output from the transmitter controller circuit 3, and the command control signal is output from the transmitter circuit 5 to the main device 7. Next, when the feedback signal c is the 8 bit data code shown in FIG. 2 c2 for resetting the memory circuit 6 and the memory circuit provided within the receiver controller circuit 9 of the main device 7, the 16 bit control data signal b shown in FIG. 2 b3 is transmitted as a control command signal through the transmitter circuit 5 to the main device 7, and also the transmitter controller circuit 3 is reset to a state where the synchronizing pulse and control signal a can be output to the command control circuit 4 and memory circuit 6. Finally, when the feedback signal c is an instruction to resend the control signal a to the main device 7 based on a signal input from the memory circuit 6 to the command control circuit 4, the control data signal b shown in FIG. 2 b1 is transmitted through the transmitter circuit 5 as a command signal. The transmitter circuit 5 outputs a pulse modulation infra-red light signal based on the input control data signal b as an operating command signal.

The receiver circuit 8 of the main device 7 receives receivable infra-red rays and carries out a conversion to an electrical signal, and if this infra-red light is an operating command signal from the remote control unit 1, the same digital code as the control data signal b is output to the receiver circuit 9 as a command signal d.

The command signal d input to the receiver control circuit 9 first has its custom code portion compared with a value previously set up in the main device 7 for the purpose of preventing erroneous operation. If even only one bit of this set value and the custom code portion of the command signal d are not in agreement the following operation is abandoned, and with the next input command signal d the operation recommences with the processing to prevent erroneous operation. If all bits of the custom code are in agreement, next the data code portion of the command signal d is processed as follows. When it is, as shown in FIG. 2 b1, for selecting an operation of the operating device 12, the data code is stored in a memory circuit provided in the receiver controller circuit 9, and also as shown in FIG. 2 b1, a signal the same as the command signal d is output from the receiver controller circuit 9 to the transmitter control circuit 14. When it is, as shown in FIG. 2 b2, for causing the execution of an operation of the operating device 12 of the main device 7, the data code portion of FIG. 2 b1 is output from the memory circuit provided in the receiver controller circuit 9 to the control output circuit 10. Again, if it is, as shown in FIG. 2 b3 for the purpose of resetting the receiver controller circuit 9, then the memory circuit provided in the receiver controller circuit 9 is put into a storable state.

In the control output circuit 10, the signal from the receiver controller circuit 9 is decoded, and a signal is output to the operating device 12 to cause the operation selected by the remote control unit 1 to be carried out. The operating device 12 carries out an operation based on the signal from the control output circuit 10, and outputs a signal for the state corresponding to this operation to the operation detecting circuit 13. The operation detecting circuit 13 outputs an 8 bit data code as shown in FIG. 2 e1 based on the signal input from the operating device 12 to the transmitter controller circuit 14.

The transmitter controller circuit 14 carries out the following operation based on the signal output by the receiver controller circuit 9 and the operation detecting circuit 13.

First, if the signal of FIG. 2 b1 from the receiver controller circuit 9 is input to the transmitter controller circuit 14, then regardless of the signal from the operation detecting circuit 13, the following operation is carried out. Specifically, as shown in FIG. 2 b11, the custom code portion of the code has all its bits inverted and output with the data code portion to the transmitter circuit 15. On the other hand, when the signal from the receiver controller circuit 9 is not present, the transmitter controller circuit 14 carries out an operation on the signal e input from the operation detecting circuit 13 as follows. When an 8 bit data code a shown in FIG. 2 e1 is input to the transmitter controller circuit 14, a 16 bit signal as shown in FIG. 2 e2, being a combination of a custom code specially provided for the operating state of the operating device 12 and the input data code, is output to the transmitting circuit 15.

The receiver circuit 16 of the remote control unit 1 receives an infra-red light signal of such an intensity as to be receivable, converts it to an electric signal, and outputs it to the receiver controller circuit 17.

When this infra-red light is a state signal from the main device 7, a signal having the same digital code as the signal output from the transmitter controller circuit 14 is output to the receiver controller circuit 17.

In the receiver controller circuit 17 the following operation is carried out according to the signal from the receiver circuit 16. First the signal has its custom code portion compared with a value previously set in the remote control unit 1 for the purposes of preventing interference, and if even only one bit is not in agreement, the following processing is not carried out. Also, when a signal is next input, processing for preventing interference is begun again. On the other hand, if the custom code agrees in all bits, the signal undergoes the following processing. When the input signal is, as shown in FIG. 2 b11 a signal output from the receiver controller circuit 9 of the main device 7 to the transmitter controller circuit 14 and sent back to the remote control unit 1 with the custom code inverted, this custom code is recognized, and a pulse is output to cause the output of the data stored in the memory circuit 6 from the receiver controller circuit 17, and the data code portion is output unchanged from the receiver controller circuit 17 to the command control circuit 4.

When the input signal, as shown in FIG. 2 e2, has the special operating state custom code for the operating device 12 produced by being input from the operation detecting circuit 13 of the main device 7 to the transmitter controller circuit 14, and returned to the remote control unit 1, then the custom code portion is identified and the data code portion is output from the receiver controller circuit 17 to the display unit 18. In the command control circuit 4, the following operation is begun with the synchronizing pulse input from the transmitter controller circuit 13. The command control circuit 4 compares the stored data from the memory circuit 6 and the data code from the receiver controller circuit 17, and if both codes agree in all bits, as shown in FIG. 2 c1 outputs an 8 bit feedback signal c to cause the execution of the operation in the main device 7, and after a fixed time outputs to the transmitter controller circuit 3 a feedback signal c as shown in FIG. 2 c2 in order to reset the transmitter controller circuit 3 and the receiver controller circuit 9 of the main device 7. If the two codes do not agree in even one bit, the memory data output by the memory circuit 6 as shown in FIG. 2 a1 is output unchanged as a feedback signal c to the transmitter controller circuit 3. In the case that the two codes are not in agreement, this operation is repeated a certain number of times, and when agreement is not reached after this number of times, the command control circuit 4 outputs to the transmitter controller circuit 3 a feedback signal c as shown in FIG. 2 c1 for the purpose of resetting the transmitter controller circuit 3 and the receiver controller circuit 9, and additionally a signal to the display unit 18 to indicate an error.

In the display unit 18, with the signals from the receiver controller circuit 17 and the command control circuit 4, the operating state of the operating device 12 of the main device 7 is displayed, and when the content of a command sent from the remote control unit 1 has not been correctly received in the main device 7, an error display is made.

The memory circuits provided in the memory circuit 6 and the receiver controller circuit 9 of the present invention may be constructed, depending on the volume of data to be stored, from latch circuits or RAM.

Figure 3:
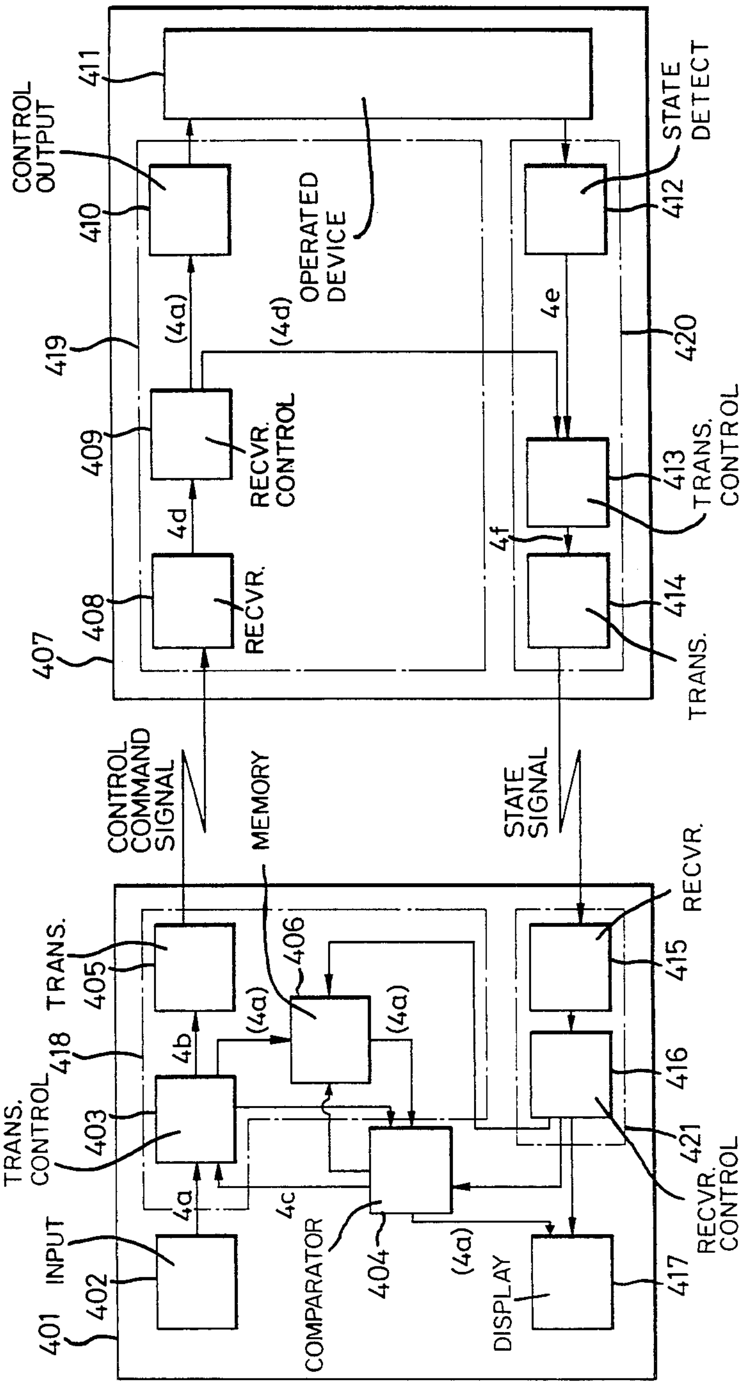
FIG. 3 is a structural diagram showing a second embodiment of the present invention.
Figure 5:
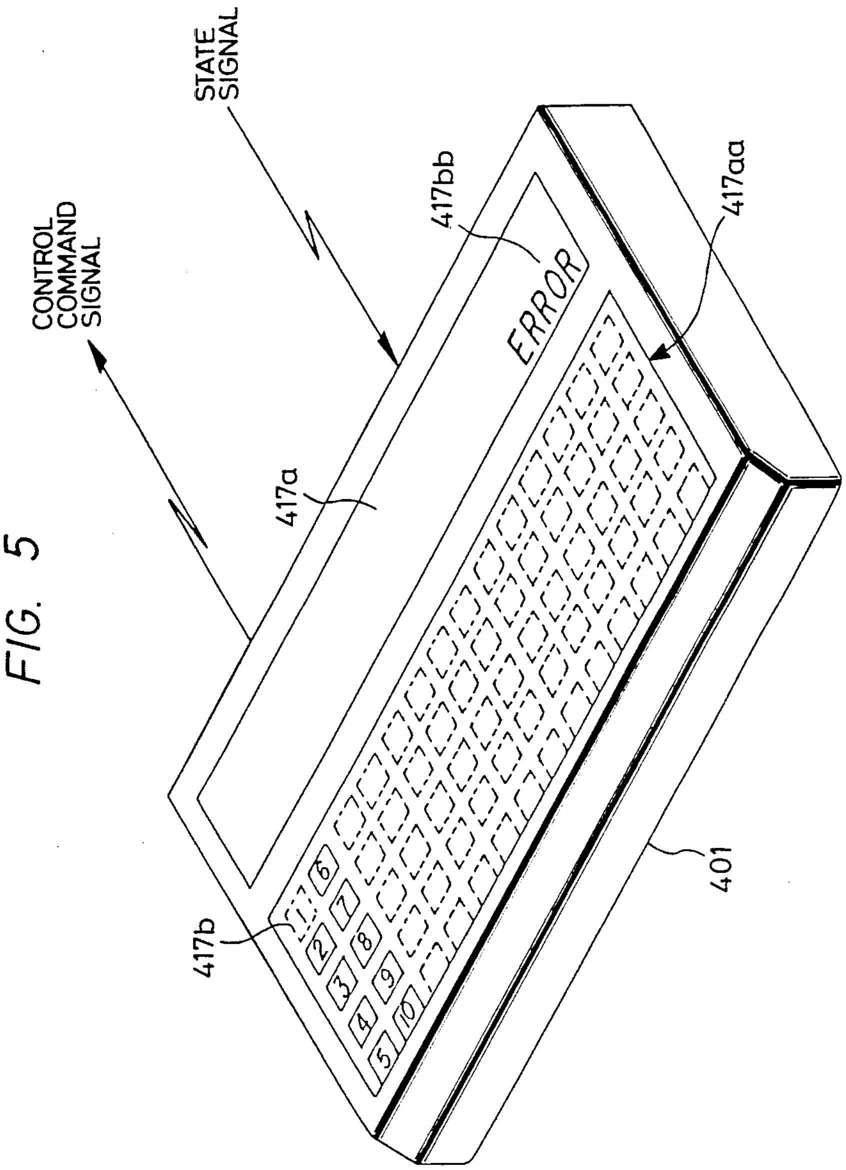
FIG. 5 is a perspective view of the state of a remote control unit displaying an error indication.
Figures 6, 7:
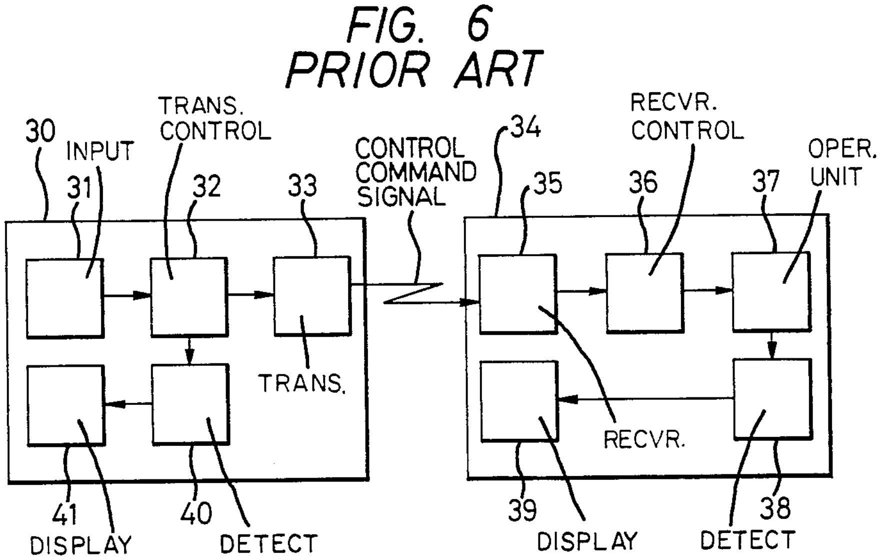
FIG. 6 PRIOR ART
FIG. 7 PRIOR ART
FIG. 6 and FIG. 7 illustrate prior art.

Next a second embodiment of the present invention is described in detail based on FIGS. 3 to 5.

FIG. 3 is a structural diagram of the embodiment, FIG. 4 illustrates the various signal codes thereof, and FIG. 5 is a perspective view of the remote control unit in the state of making an error display.

In the drawings, 401 is a remote control unit, 402 is a control input unit, 403 and 413 are transmitter controller circuits, 404 is a command control circuit, 405 and 414 are transmitter circuits, 406 is a memory circuit, 407 is a main device, 408 and 415 are receiver circuits, 409 and 416 are receiver controller circuits, 410 is a control output circuit, 411 is an operating device, 412 is an operation detecting circuit, 417 is a display unit, 417*a* is a display portion displaying the operating state of the main device, 417*aa* is a display portion provided corresponding to the control input unit 402, 417*b* is a position of an error display on the display portion 417*aa*, 417*bb* is a position of an error display on the display portion 417*a*, 418 is a transmission unit, 419 is a receiving uint, 420 is a reply transmission unit, and 421 is a monitor.

Next, to explain the operation, the control input unit 402 is of a construction combining a display unit 417 such as for example a touch panel, and depending on the control operation an 8 bit control signal 4*a* as shown in FIG. 4 a1 is output to the transmission unit 418.

In the transmission unit 418, as the control signal 4*a* is input to the transmitter control circuit 403, first, in order to prevent interference with the signals of other devices, an 8 bit custom code and the control code 4*a* as a data code are combined. The 16 bit control data signal 4*b* as shown in FIG. 4 4b1 formed from the custom code and data code is transmitted through the transmitter circuit 405 to the main device 407 as an infra-red light operating command signal. Also at this time, a synchronizing pulse for the command control circuit 404 and a control signal 4*a* for the memory circuit 406 are output respectively from the transmitter controller circuit 403. The synchronizing pulse is output in synchronization with the control signal 4*a* being input to the transmitter controller circuit 403, initiates a particular operation in the command control circuit 404, and until the transmitter controller circuit 403 is reset the next synchronizing pulse is not output. The control signal 4*a* is temporarily stored in the memory circuit 406, and until the transmitter controller circuit 403 is reset is not output from the transmitter controller circuit 403 to the memory circuit 406.

When the feedback signal 4*c* from the command control circuit 404 is input, the transmitter controller circuit 403 carries out the following operation regardless of the control signal a input. First, when the feedback signal 4*c* is as shown in FIG. 4 4*c*1 an 8 bit data code for causing the main device 407 to carry out an operation, the 16 bit control data signal 4*b* shown in FIG. 4 4*b*2 is output from the transmitter controller circuit 403, and the command control signal is output from the transmitter circuit 405 to the main device 407.

Next, when the feedback signal 4*c* is the 8 bit data code shown in FIG. 4 4*c*2 for resetting the memory circuit provided within the receiver controller circuit 409 of the main device 407 described below, the 16 bit control data signal 4*b* shown in FIG. 4 4*b*3 is transmitted as a control command signal through the transmitter circuit 405 to the main device 407, and also the transmitter controller circuit 403 is reset. When the feedback signal 4*c* is an instruction to resend the control signal 4*a* as a operating command to the main device 407 based on a signal input from the memory circuit 406 to the command control circuit 404, the control data signal 4*b* shown in FIG. 4 4*b*1 is transmitted through the transmitter circuit 405 as a command signal. The transmitter circuit 405 outputs a pulse modulation infra-red light signal based on the input control data signal 4*b* as an operating command signal.

The receiving unit 419 of the main device 407 receives the command control signal from the remote control unit 401 and carries out the following operation. The receiver circuit 408 of the receiving unit 419 receives receivable infra-red rays and carries out a conversion to an electrical signal, and outputs this to the receiver controller circuit 409. If this infra-red light is an operating command signal from the remote control unit 401, the same digital code as the control data signal 4*b* is output as a command signal 4*d*. The command signal 4*d* input to the receiver control circuit 409 first has its custom code portion compared with a value previously set up in the main device 407 for the purpose of preventing erroneous operation. If even only one bit of this set value and the custom code portion of the command signal **4*d* are not in agreement the following operation is abandoned, and with the next input command signal 4*d* the operation recommences with the processing to prevent erroneous operation. If all bits of the custom code are in agreement, next the data code portion of the command signal 4*d*** is processed as follows.

When the data code portion is, as shown in FIG. 4 **4*b*1, for selecting an operation of the operating device 411, the data code is stored in a memory circuit provided in the receiver controller circuit 409, and also a signal the same as in FIG. 4 4*b*1 is output from the receiver controller circuit 409 to the transmitter control circuit 413 of the reply transmission unit 420**.

When the input command signal **4*d* is, as shown in FIG. 2 *b*2, for causing the execution of an operation of the operating device 411, the data code portion of FIG. 4 4*b*1 is output from the memory circuit provided in the receiver controller circuit 409 to the control output circuit 410. Again, if it is, as shown in FIG. 4 4*b*3 for the purpose of resetting the receiver controller circuit 409, then the memory circuit provided in the receiver controller circuit 409 is put into a storable state. In the control output circuit 410, the signal from the receiver controller circuit 409 is decoded, and a signal is output to the operating device 411 to cause the operation selected by the remote control unit 401** to be carried out.

The operating device 411 carries out an operation based on the signal from the control output circuit 410, and outputs a signal corresponding to this operation to the operation detecting circuit 412 in the reply transmission unit 420.

The operation detecting circuit 412 outputs an 8 bit data code as shown in FIG. 4 **4*e*1 based on the signal input from the operating device 411 to the transmitter controller circuit 413**.

The transmitter controller circuit 413 carries out the following operation based on the signal output by the receiver controller circuit 409 of the receiving unit 419 and the operation detecting circuit 412.

First, if a signal from the receiver controller circuit 409 is input to the transmitter controller circuit 413, then regardless of the signal **4*e* from the operation detecting circuit 412, then as shown in FIG. 4 4b11, the custom code portion of the code has all its bits inverted and output with the data code portion to the transmitter circuit 414**.

On the other hand, when the signal from the receiver controller circuit 409 is not present, the transmitter controller circuit 413 carries out an operation on the signal **4*e* input from the operation detecting circuit 412 as follows. When an 8 bit data code as shown in FIG. 4 4*e*1 is input to the transmitter controller circuit 413, a 16 bit signal 4*f* as shown in FIG. 4 4*f*1, being a combination of a custom code specially produced for the operating state of the operating device 411 and the input data code, is output to the transmitter circuit 414. The transmitter circuit 414 transmits to the remote control unit 401 an infra-red light state signal being a pulse modulation signal based on the input signal 4*f***.

The monitor unit 421 of the remote control unit 401 receives a state signal from the main device 407 and operates as follows. The receiver circuit 415 of the monitor unit 421 receives a receivable infra-red light signal, converts it to an electric signal, and outputs it to the receiver controller circuit 416. When this infra-red light is a state signal from the main device 407, a signal having the same digital code as the signal **4*f* output from the transmitter controller circuit 413 is output to the receiver controller circuit 416. In the receiver controller circuit 416, the input signal from the receiver circuit 415 has its custom code portion compared with a value previously set in the remote control unit 401 for the purposes of preventing interference, and if even only one bit is not in agreement, the following processing is not carried out. Also, when a signal is next input, processing for preventing interference is begun again. On the other hand, if the custom code agrees in all bits, the signal undergoes the following processing. When the input signal is, as shown in FIG. 4 4*b*11 a signal output from the receiver controller circuit 409 of the main device 407 through the transmitter controller circuit 414 and sent back to the remote control unit 401, the custom code is recognized, and a pulse is output to cause the output of the data stored in the memory circuit 406 from the transmission unit 418 of the receiver controller circuit 416, and the data code portion is output unchanged from the receiver controller circuit 416 to the command control circuit 404**.

When the input signal, as shown in FIG. 4 **4*f*1, has been input from the operation detecting circuit 412 of the main device 407 to the transmitter controller circuit 414, and returned to the remote control unit 401, then the custom code portion is identified and the data code portion is output from the receiver controller circuit 416 to the display unit 417. At this point, the display of the display unit 417 is displayed on the display portion 417*a* of FIG. 5, and the action of the operating device 411 can be monitored. In the command control circuit 404, the stored data from the memory circuit 406 and the data code from the receiver controller circuit 416 are compared, and if both codes agree in all bits, as shown in FIG. 5 4*c*1 an 8 bit feedback signal 4*c* to cause the execution of the operation in the operating device 411 of the main device 407 is output, and after a fixed time next a feedback signal 4*c* as shown in FIG. 4 4*c*2 is output to the transmitter controller circuit 403 in order to reset the transmitter controller circuit 403 and the receiver controller circuit 409 of the main device 407**.

If the two codes do not agree in even one bit, the memory data output by the memory circuit 406 as shown in FIG. 4 **4*a*1 is output unchanged as a feedback signal 4*c* to the transmitter controller circuit 403, and the control command signal is again transmitted to the main device 407. In the case that the two codes are not in agreement, this operation is repeated a certain number of times, and when agreement is not reached after this number of times, the command control circuit 404 outputs to the transmitter controller circuit 403 a feedback signal 4*c* as shown in FIG. 4 4*c*1 for the purpose of resetting the transmitter controller circuit 403 and the receiver controller circuit 409, and additionally an output command pulse is output from the command control circuit 404 to the memory circuit 406 in order to cause an indication of the source of the error on the display unit 417, and in response to this pulse the stored data is output from the memory circuit 406 through the command control circuit 404 to the display unit 417**.

In the display unit 417, based on the stored data input through the command control circuit 404, the operation key which, even though operated on the control input unit 402 the main device 407 did not execute, is displayed as an error display on the display portion **417*aa*** in FIG. 5. At this point, if the operation key is supposed to be the Arabic numeral key '1', then on the error display position 417*b* the portion for the key '1' will flash. In synchronization with this error display, the error display position 417*bb* on the display portion 417*a* will also be displayed. Seeing these error displays, the user will carry out the same operation again for correction purposes.

In addition to the above embodiment, it should be noted that the key error display positions can also be displayed on the display portion 417*a*, and the control input unit 402 can also be constructed with mechanical tactile switches and so forth.

In addition, the memory circuits provided in the memory circuit 406 and the receiver controller circuit 409 of the present invention may be constructed, depending on the number of bits in the control signals, which is the volume of data to be stored, from latch circuits or RAM or the like.

BENEFIT

As in the above description, the benefit is that the operating state of the main device 7 is displayed on the display unit of the remote control device 1, and the content of the commands from the remote control unit 1 and the contents of the signal received by the main device 7 are compared, and when different an error indication is given, so that whereas conventionally the work of monitoring the operating state of the main device before and after a command input, according to the present invention the input operation is simplified because it is only necessary to monitor the display unit provided in the remote control unit 1 at hand, and furthermore the reliability can be improved.

According to the second embodiment of the present invention, the benefit is provided that since the construction is such that on the display unit 417 of the remote control unit 401 is displayed the operating state of the main device 407 and when the signal receiving state of the main device 407 is determined the control state when an error occurs, whereas conventionally it was necessary to compare visually before and after an input operation the operating state of the main device 407 and the state of control of the remote control unit 401, it is sufficient to observe only the display unit 417 of the remote control unit 401 while carrying out an input operation, correction can also be simplified, and the reliability of input data can also be improved.

Although the present invention has been shown and described in terms of certain preferred embodiments thereof, and with reference to the appended drawings, it should not be considered as being particularly limited thereby. The details of any particular embodiment, or of the drawings, could be varied without in many cases departing from the ambit of the present invention. Accordingly, the scope of the present invention is to be considered as being delimited, not by any particular perhaps entirely fortuitous details of the disclosed preferred embodiments, or of the drawings, but solely by the legitimate and properly interpreted scope of the accompanying claims, which follow.

What is claimed is:

1. A remote control system comprising:

a remote control device including:

(a) a control input unit for providing a control signal;

(b) a first memory circuit for storing said control signal;

(c) a first transmitter circuit for combining a custom code with a data code corresponding to said control signal to form a first command signal, and transmitting the first command signal to a main device controlled by said remote control device, and for transmitting a second command signal, including said custom code, to said main device in response to a feedback signal provided by a command control circuit in said remote control device;

(d) a second receiver circuit for receiving a return signal transmitted from the main device and providing said return signal to a comparator circuit;

(e) said comparator circuit in said command control circuit for comparing said return signal with said control signal stored in said first memory circuit, and for providing said feedback signal to said first transmitter circuit if said return and stored control signals correspond to each other; and said main device including:

(f) a first receiver circuit for receiving said first and second command signals from said remote control device, for decoding the custom code from said command signals and comparing the decoded custom code with a predetermined value, and if said decoded custom code matches said predetermined value, for providing the return signal in response to said first command signal, and for providing an operating command signal in response to said second command signal;

(g) a second transmitter circuit for transmitting said return signal to said remote control device if said return signal is provided by said first receiver circuit; and (h) an operated device for performing a desired operation of said main device if said operating command signal is provided by said first receiver circuit.

2. A remote control system according to claim 1, wherein said first receiver circuit of said main device includes a second memory circuit for storing an operating command signal based upon said first command signal from said remote control device, said first receiver circuit thereupon outputting said stored operating command signal in response to receipt of said second command signal from said remote control device.

3. A remote control system according to claim 1, wherein said remote control device further comprises a display unit, and wherein said comparator circuit provides an error signal to said display unit for displaying an error message if said return and stored control signals do not correspond with each other.

4. A remote control system according to claim 3, wherein said comparator circuit compares said return and stored control signals and, if they do not correspond, provides a resend signal to said first transmitter circuit to resend said first command signal for a predetermined time before providing said error signal.

5. A remote control system according to claim 3, wherein said operated device of said main device provides a state signal to said second transmitter circuit in response to receipt of said operating command signal, said second transmitter circuit transmits said state signal to said remote control device, and said second receiver circuit provides a signal to said display unit for displaying an operating state of said operated device.

6. A remote control system comprising:

a remote control device including:

(a) a control input unit for providing a control signal;

(b) a first memory circuit for storing said control signal;

(c) a first transmitter circuit for transmitting a first command signal based on said control signal to a main device controlled by said remote control device, and for transmitting a second command signal to said main device in response to a feedback signal provided by a command control circuit in said remote control device;

(d) a second receiver circuit for receiving a return signal transmitted from the main device and providing said return signal to a comparator circuit;

(e) said comparator circuit in said command control circuit for comparing said return signal with said control signal stored in said first memory circuit, and for providing said feedback signal to said first transmitter circuit if said return and stored control signals correspond to each other; and said main device including:

(f) a first receiver circuit for receiving said first and second command signals from said remote control device, for providing a return signal in response to said first command signal, and for providing an operating command signal in response to said second command signal;

(g) a second transmitter circuit for transmitting said return signal to said remote control device if said return signal is provided by said first receiver circuit; and (h) an operated device for performing a desired operation of said main device if said operating command signal is provided by said first receiver circuit;

wherein said remote control device further comprises a display unit, and wherein said comparator circuit provides an error signal to said display unit for displaying an error message, and provides a control message corresponding to said control signal to said display unit for display with said error message, if said return and stored control signals do not correspond with each other.

* * * * *